(12) United States Patent
Pelagotti et al.

(10) Patent No.: US 7,039,109 B2
(45) Date of Patent: May 2, 2006

(54) REDUCING HALO-LIKE EFFECTS IN MOTION-COMPENSATED INTERPOLATION

(75) Inventors: Anna Pelagotti, Eindhoven (NL); Robert Jan Schutten, Campbell, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 583 days.

(21) Appl. No.: 10/046,626

(22) Filed: Jan. 14, 2002

(65) Prior Publication Data

US 2002/0159527 A1 Oct. 31, 2002

(30) Foreign Application Priority Data

Jan. 16, 2001 (EP) ................................. 01200140

(51) Int. Cl.
*H04N 7/12* (2006.01)

(52) U.S. Cl. ............ 375/240.16; 375/240; 375/240.01; 375/240.12

(58) Field of Classification Search ........... 375/240.16, 375/240, 240.01, 240.12, 240.24; 348/448, 348/699
See application file for complete search history.

(56) References Cited

U.S. PATENT DOCUMENTS

| | | | |
|---|---|---|---|
| 5,376,971 A * | 12/1994 | Kadono et al. ............. | 348/699 |
| 5,412,435 A * | 5/1995 | Nakajima ................... | 348/699 |
| 5,654,759 A | 8/1997 | Augenbraun et al. ....... | 348/405 |
| 5,777,682 A | 7/1998 | De Haan et al. ............ | 348/452 |
| 5,982,441 A | 11/1999 | Hurd et al. ................. | 348/417 |
| 5,995,154 A | 11/1999 | Heimburger ................ | 348/448 |

FOREIGN PATENT DOCUMENTS

| | | |
|---|---|---|
| EP | 0929192 | 7/1999 |
| WO | WO9922520 | 5/1999 |

* cited by examiner

*Primary Examiner*—Allen Wong
(74) *Attorney, Agent, or Firm*—Edward W. Goodman

(57) ABSTRACT

The invention relates to a motion-compensated interpolation of a data-signal, which data-signal comprises successive images wherein each image comprises groups of pixels, in which motion vectors are generated (18), each motion vector corresponding to a group of pixels of one image, between a group of pixels of said one image and a second group of pixels of another image in the data-signal, and interpolated results are obtained (16) as a function of these motion vectors. In accordance with the present invention, the reliability of each motion vector corresponding to a particular group of pixels is estimated (20), weights are calculated as a function of the reliability of the motion vectors, and interpolated luminous intensities of groups of pixels are generated for an interpolated image by calculating, on the basis of these weights, weighted averages of the interpolated results.

7 Claims, 2 Drawing Sheets

REDUCING HALO-LIKE EFFECTS IN MOTION-COMPENSATED INTERPOLATION

The invention relates to a motion-compensated interpolation of a data-signal, which data-signal comprises successive images wherein each image comprises groups of pixels, in which motion vectors are generated, each motion vector corresponding to a group of pixels of one image, between a group of pixels of said one image and a second group of pixels of another image in the data-signal, and interpolated results are obtained as a function of these motion vectors. Furthermore, the invention relates to a picture signal display apparatus comprising means for receiving a data-signal, and a device for motion-compensated interpolation of this data-signal.

U.S. Pat. No. 5,777,682 describes that at least two motion vectors are calculated for each group of pixels of an image. Then, for each motion vector an interpolated result is calculated. Finally, the thus obtained interpolated results are averaged which finally yields an interpolated image. A disadvantage of that method is that the area of the halo-effect in the interpolated images is increased. The halo-effect is due to impairments (blurring and/or magnifying lens effect) mainly occurring at the boundaries of moving objects, caused by incorrect motion vectors and/or an incorrect interpolation strategy (not taking the occlusion problem into account) in the motion compensated interpolated images of the data-signal. For an observer of the images the halo-effect is an annoying effect.

It is an object of the invention to provide a motion-compensated interpolation that reduces the area of the halo-effect in the interpolated images of the data-signal. The invention therefore provides a motion-compensated interpolation that further comprises:

estimating the reliability of each motion vector corresponding to a particular group of pixels;

calculating weights as a function of the reliability of the motion vectors; and generating an interpolated luminous intensity of a group of pixels for an interpolated image by calculating, on the basis of these weights, a weighted average of the interpolated results.

Advantageous embodiments are defined in the dependent claims.

The reliability of a motion vector can be a function of the accuracy of the motion vector. The accuracy of the motion vector is determined by the difference of a predicted luminous intensity on the basis of the motion vector, wherein the motion vector is assigned to a first group of pixels of a first image, for a second group of pixels in a second image and the actual luminous intensity of the second group of pixels of the second image. The reliability of a motion vector can also be a function of the relative frequency of occurrence of the motion vector in the neighboring groups of pixels of the first group of pixels. Generally, there will be eight neighboring groups of pixels in the first image of the first group of pixels. The reliability of the motion vector can also be a function of both the accuracy of the motion vector and its relative occurrence.

For each interpolation result a weight is calculated as a function of the reliability of the motion vector which yielded the interpolation result. Since each group of pixels is assigned a multiple of motion vectors this leads a multiple of interpolation results and corresponding weights per group of pixels.

Eventually, the interpolated luminous intensity of a group of pixels is calculated as a weighted average of the interpolation results on the basis of the reliability of the interpolation results. This approach yields some important advantages. A first example of this is the situation wherein among the multiple of motion vectors just one motion vector is the right one. Then, the interpolation result, which corresponds to this motion vector, is assigned a relative great weight such that this interpolation result dominates the interpolated luminous intensity of the group of pixels. As a result a high accuracy of the interpolated intensity of the group of pixels is obtained and fine details in the picture can be shown without the risk of the halo-effect to appear. A second example of an advantage of the approach according to the invention is the situation wherein neither of the motion vectors is correct. In this situation the multiple of motion vectors will show a great diversity and none of the motion vectors will be assigned a heavy weight. The effect is that the interpolated intensity of the group of pixels will be a smooth average of the interpolated results. In this case no fine details are showed, the picture will be blurred. However, for an observer a blurred picture is more attractive than wrongly flickering details. So, in either of the two examples the halo-effect is reduced.

An embodiment of the method of the invention is characterized in that the interpolated luminous intensity of a group of pixels is calculated according to:

$$I^{k+\Delta}(\vec{x}) = \left(\sum_{m=1,\ldots,M} \{w_m^k(\vec{x}) * i_m^{k+\Delta}(\vec{x})\}\right) / \sum_{m=1,\ldots,M} \{w_m^k(\vec{x})\}, \qquad (I)$$

wherein $I^{k+\Delta}(\vec{x})$ is the interpolated luminous intensity of the group of pixels of the interpolated image $F^{k+\Delta}$, wherein the real value $\Delta$ defines the place of the interpolated image $F^{k+\Delta}$ in the image sequence $F^n$, $n=1,2,\ldots,k,k+1,\ldots,N$. Generally $\Delta$ is a real value in the interval $[0, 1]$. Furthermore, in (I), the location of the group of pixels in the image is defined with the integer two-dimensional vector $\vec{x}$, $\Sigma_{m=,\ldots,M}\{.\}$ is a summation from 1 to M over its argument $\{.\}$ and $w_m^k(\vec{x})$ is a weight corresponding to the $m^{th}$ interpolation result $i_m^{k+\Delta}(\vec{x})$. The $m^{th}$ interpolation result $i_m^{k+\Delta}(\vec{x})$ can for example be calculated according to the following interpolation strategy:

$$i_m^{k+\Delta}(\vec{x}) = \mathrm{median}\{(I^k(\mathrm{round}\{\vec{x} - \Delta * \vec{D}_m^k(\vec{x})\}), (I^k(\vec{x}) + I^{k+1}(\vec{x}))/2, \qquad (II)$$
$$(I^{k+1}(\mathrm{round}\{\vec{x} + (1-\Delta) * \vec{D}_m^k(\vec{x})\})\},$$

wherein median{.} is a function which gives the median value of its input arguments and round{.} is a function which gives the nearest integer value to each component of its input argument, and wherein $I^k(\vec{x})$ is a luminous intensity of a group of pixels at location $\vec{x}$ in the image $F^k$ and wherein $\vec{D}_m^k(\vec{x})$ is the $m^{th}$ two-dimensional integer motion vector of the M motion vectors which correspond to the group of pixels at location $\vec{x}$ in the image $F^k$, which $m^{th}$ motion vector is normalized between two successive images, and wherein the weight $w_m^k(\vec{x})$ is a function of the reliability of the motion vector $\vec{D}_m^k(\vec{x})$. In this embodiment the interpolation (II) is carried out between two successive images $F^k$ and $F^{k+1}$ which leads to a very accurate interpolated image $F^{k+\Delta}$. The implementation of the median-function in equation (II) is a further measure that reduces the risk of interpolating wrong flickering details.

A further embodiment of the invention is characterized in that the reliability and thus the weight of the motion vector $\vec{D}_m^k(\vec{x})$ is a function of the difference between the luminous intensities $I^k(\vec{x})$ and $I^{k+1}(\vec{x}+\vec{D}_m^k(\vec{x}))$ and is also a function of the relative frequency of the relative frequency of occurrence of $\vec{D}_m^k(\vec{x})$ in the neighborhood of the location $\vec{x}$ in the image $F^k$. In this manner the reliability of the motion vector comprises two components. The first component is the accuracy of the motion vector, which is established on the basis of at least two luminous intensities of at least two successive images. The second component is the consistency, which is established on the basis of the relative occurrence of the motion vector in at least one image.

In yet another embodiment the method of the invention is characterized in that the generation of interpolated luminous intensities of groups of pixels according to the method of the invention is only performed in those parts in the images of the data-signal where edges in the motion vector field are located. This leads to the advantage that the interpolation according to the invention is only performed in those parts of the image where the halo effect is most likely to occur. This can save processing time.

A further embodiment of the invention is characterized in that the method comprises a step of edge detection, wherein an edge in the (motion vector field of) image $F^k$ is detected if at least one of the following inequalities (III) and (IV) is satisfied:

$$\left\| \left[\vec{D}_q^k(\vec{x}-\vec{K})\right]_1 - \left[\vec{D}_q^k(\vec{x}+\vec{K})\right]_1 \right\| > T, \quad (III)$$

$$\left\| \left[\vec{D}_q^k(\vec{x}-\vec{K})\right]_2 - \left[\vec{D}_q^k(\vec{x}+\vec{K})\right]_2 \right\| > T, \quad (IV)$$

wherein q is a pre-determined integer value, where $\|.\|$ is a function which yields the absolute value of its input argument and wherein $[.]_p$ is a function which yields the $p^{th}$ component of its vector input argument. Furthermore, in (III) and (IV), T is a pre-determined fixed real value threshold and $\vec{K}$ is a vector which is given by:

$$\vec{K}=(K_1;K_2)^T, \quad (V)$$

where $K_1$ and $K_1$ are integer values. In this embodiment of the invention, with (III) and (IV), the definition of an edge is determined by discontinuities that appear between motion vectors of the same kind in the same image.

These and other aspects of the invention will be apparent from and elucidated with reference to the embodiments described hereinafter.

In the accompanying drawings, in which certain modes of carrying out the present invention are shown for illustrative purposes:

Figure 1:
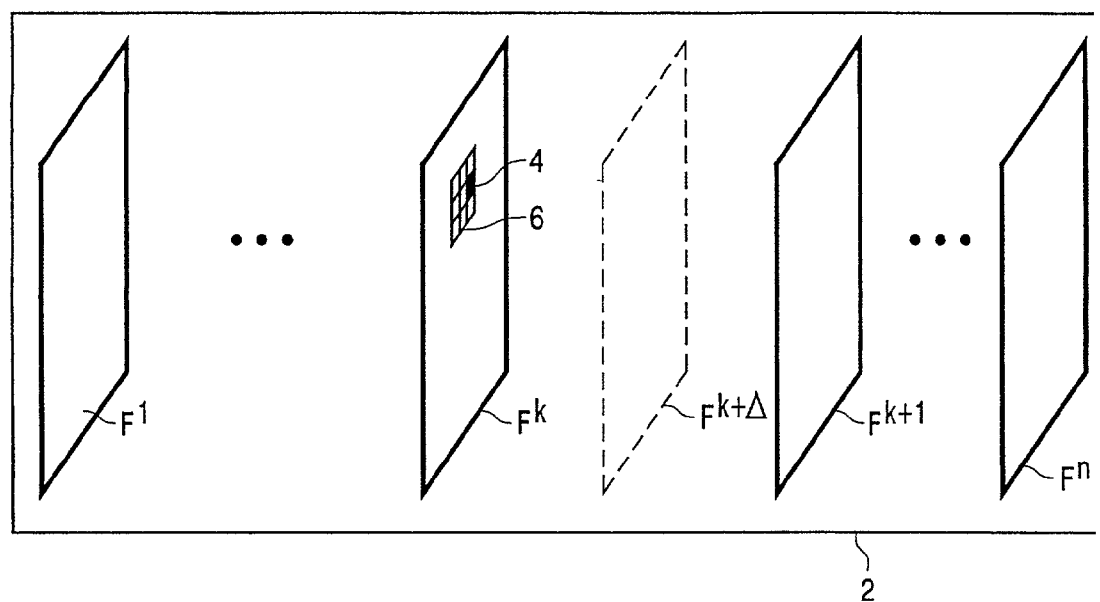
FIG. 1 is a schematic perspective overview of a data-signal comprising successive images.

In the motion compensating interpolation-method according to the invention a data-signal comprises a sequence of images $F^n$, n=1, ... ,k,k+1, ... ,N. The data-signal can be a movie wherein each image is a picture. In FIG. 1 such a data-signal 2 is shown schematically by depicting the images $F^1$, $F^k$, $F^{k+1}$ and $F^N$. Furthermore an image $F^{k+\Delta}$ is shown. This image, for example, can be obtained by interpolating the images $F^k$ and $F^{k+1}$. The real value $\Delta$ defines the relative position of the interpolated image $F^{k+\Delta}$ in the sequence of images.

Figure 2:
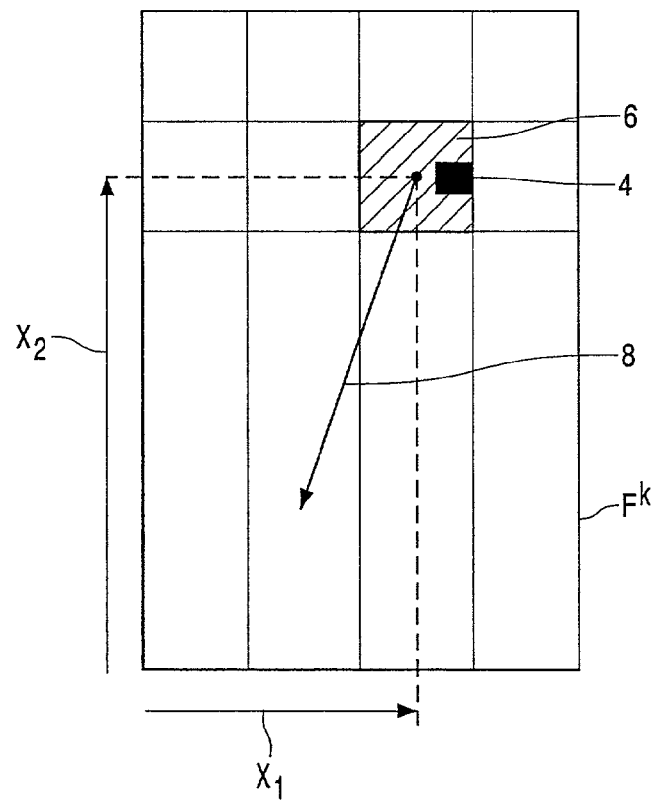
FIG. 2 shows an image of the data-signal.

FIG. 2 shows the image $F^k$ in more detail. Each image is built up of pixels. A pixel 4 is the smallest element of an image that can be given a certain luminous intensity. A number of pixels 4 constitute a group of pixels 6 (also called a block), this number of pixels in a group of pixels (or in a block) is pre-defined and can be any integer which is greater than zero. The location of a particular group of pixels in the image is indicated with a two-dimensional integer vector $\vec{x}=[x_1,x_2]^T$, the components $x_1$ and $x_2$ of $\vec{x}$ of the group of pixels 6 are shown in FIG. 2. Each group of pixels has a certain luminous intensity. The luminous intensity of the group of pixels at location $\vec{x}$ in the image $F^k$ is $I^k(\vec{x})$. For the interpolation of the data-signal 2 motion vectors $\vec{D}_m^k(\vec{x})$ 8 have to be established. These motion vectors are two-dimensional integer vectors that are normalized between successive images. A motion vector $\vec{D}_m^k(\vec{x})$ is assigned to a group of pixels at the location $\vec{x}$ in the image $F^k$ and predicts the location of the corresponding luminous intensity in the image $F^{k+1}$. Since a multiple of M motion vectors $\vec{D}_m^k(\vec{x})$ can be assigned to each group of pixels, the motion vectors are numbered m=1,2, ... ,M.

In a first step, for a particular image, for each group of pixels of the image a motion vector 8 is calculated. Then, in a second step, each group of pixels will be assigned also those motion vectors that were already assigned to neighboring groups of pixels in the preceding step. In this example the group of pixels and its neighboring groups of pixels are all located in the same image. Furthermore, in this example, only the eight closest neighboring groups of pixels are used. In other embodiments of the invention the number and relative location of the neighboring groups of pixels can be chosen differently than in this example.

At this stage each group of pixels has been assigned multiple motion vectors. In a third step the reliability of each motion vector is calculated. The reliability of a motion vector can be a function of the accuracy of the motion vector. The accuracy of the motion vector is determined by the difference of a predicted luminous intensity on the basis of the motion vector, wherein the motion vector is assigned to a first group of pixels of a first image, for a second group of pixels in a second image and the actual luminous intensity of the second group of pixels of the second image. The reliability of a motion vector can also be a function of the relative frequency of occurrence of the motion vector in the neighboring groups of pixels of the first group of pixels. Generally, there will be eight neighboring groups of pixels in the first image of the first group of pixels. The reliability of the motion vector can also be a function of both the accuracy of the motion vector and its relative occurrence.

The fourth step comprises the interpolation between the images. This interpolation is in principle carried out for each motion vector that has been assigned to the groups of pixels. Each motion vector yields an interpolation result, wherein each interpolation result is provided with a weight that is calculated on the basis of the reliability of the motion vectors.

Finally, in step five, the interpolation results are averaged in accordance with the weights, yielding the interpolation luminous intensities $I^{k+\Delta}(\vec{x})$. All these interpolation luminous intensities together define the interpolated image $F^{k+\Delta}$.

The interpolation method as described hereinbefore is elaborated in more detail with the following mathematical formulas. For each of the M motion vectors of the corresponding group of pixels of the image $F^k$ an interpolation result $i^{k+\Delta}_m(\vec{x})$ for the image $F^{k+\Delta}$ is calculated. The $m^{th}$ interpolation result $i^{k+\Delta}_m(\vec{x})$ corresponding to $\vec{D}_m^k(\vec{x})$ is for example given by:

$$i^{k+\Delta}_m(\vec{x}) = \text{median}\{(I^k(\text{round}\{\vec{x} - \Delta * \vec{D}_m^k(\vec{x})\})), (I^k(\vec{x}) + I^{k+1}(\vec{x}))/2, \quad (II)$$
$$(I^{k+1}(\text{round}\{\vec{x} + (1-\Delta) * \vec{D}_m^k(\vec{x})\}))\},$$

where median{.} is a function which gives the median value of its input arguments and round{.} is a function which gives the nearest integer value to each component of its input argument. The rationale of choosing a median function in (VI) is the following. If the luminous intensities $I^k(\text{round}\{\vec{x} - \Delta * \vec{D}_m^k(\vec{x})\})$ and $I^{k+1}(\text{round}\{\vec{x} + (1-\Delta) * \vec{D}_m^k(\vec{x})\})$ both correspond to a moving object, which object thus has to be visible in both the images $F^k$ and $F^{k+1}$, then the first and the third argument of (VI) will both lead to approximately the same values. Consequently a luminous intensity $i^{k+\Delta}_m(\vec{x})$ which is one of these two values, will be the desired output of (VI). However, if the moving object is not visible (for example since it is covered by the background of the picture in the image) in at least one of the images $F^k$ and $F^{k+1}$, then the first and third argument may lead to different values of the luminous intensity. In this case there is no consistency between the pictures of the two successive images and the best way to handle this situation is to prevent extreme luminous intensities. This can be done by choosing the median value of the two luminous intensities of the moving object in the images $F^k$ and $F^{k+1}$ (which are the first and third input argument in (VI)) and the average of the luminous intensities of the images $F^k$ and $F^{k+1}$ of the group of pixels at the location $\vec{x}$ (this is the second input argument in (VI)).

At this stage for each motion vector $\vec{D}_m^k(\vec{x})$ m=1,2,..., M an interpolation result $i^{k+\Delta}_m(\vec{x})$ is obtained according to (VI)). Furthermore, a relative weight $w_m^k(\vec{x})$ corresponding to the $m^{th}$ interpolation result $i^{k+\Delta}_m(\vec{x})$ is calculated on the basis of the reliability of the motion vector. With this the resulting interpolated luminous intensity $I^{k+\Delta}(\vec{x})$ of the image $F^{k+\Delta}$ can be calculated in the following way:

$$I^{k+\Delta}(\vec{x}) = \left(\sum_{m=1,\ldots,M}\{w_m^k(\vec{x}) * i^{k+\Delta}_m(\vec{x})\}\right) / \sum_{m=1,\ldots,M}\{w_m^k(\vec{x})\}, \quad (I)$$

wherein $\Sigma_{m=1,\ldots,M}\{.\}$ is a summation from 1 to M over its argument{.}.

In an advanced embodiment of the invention the reliability of the motion vector is a function of two components: its accuracy and its consistency. The accuracy of $\vec{D}_m^k(\vec{x})$ is a function of the difference between the luminous intensities $I^k(\vec{x})$ and $I^{k+1}(\vec{x} + \vec{D}_m^k(\vec{x}))$. The consistency of $\vec{D}_m^k(\vec{x})$ is a function of the relative frequency of occurrence of $\vec{D}_m^k(\vec{x})$ in the neighborhood of the location $\vec{x}$ in the image $F^k$. By this approach the accuracy of the motion vector in relation to the size of the moving object, measured in groups of pixels, is estimated by comparing luminous intensities from at least two successive images. The consistency of the motion vector is estimated on the basis of information of at least one image.

In a further advanced embodiment according to the invention the generation of interpolated luminous intensities according to the invention is only performed in those parts of the images of the data-signal where edges within the motion vector field are detected. Normally the interpolation of plane areas, i.e. areas without edges, in a motion vector field will not give rise to annoying interpolation errors, therefore in these parts of the images a conventional interpolation method can be used.

In again a further advanced embodiment of the invention the method comprises a step of edge detection wherein an edge in the (motion vector field of) image $F^k$ is detected if at least one of the inequalities (VIII) and (IX) is satisfied:

$$\left\|[\vec{D}_q^k(\vec{x} - \vec{K})]_1 - [\vec{D}_q^k(\vec{x} + \vec{K})]_1\right\| > T, \quad (III)$$

$$\left\|[\vec{D}_q^k(\vec{x} - \vec{K})]_2 - [\vec{D}_q^k(\vec{x} + \vec{K})]_2\right\| > T, \quad (IV)$$

wherein q is a pre-determined integer value and wherein $\|.\|$ is a function which yields the absolute value of its input argument. Furthermore $[.]_p$ is a function which yields the $p^{th}$ component of its vector input argument, in this example p can be 1 or 2. The real value T is a pre-determined threshold and $\vec{K}$ is a two-dimensional integer vector which is given by:

$$\vec{K} = (K_1; K_2)^T, \quad (X)$$

where $K_1$ and $K_1$ are integer values. If more than one motion vector is assigned to a group of pixels (M>1) then a particular motion vector has to be chosen for that group of pixels by selecting an integer value for q ($1 \leq q \leq M$) in (VIII) and (IX). For the detection of edges in the $[1,0]^T$ direction a possible procedure is to choose $K_1$ unequal to zero and $K_2$ equal to zero. Edges in the $[0,1]^T$ direction can be detected with $K_1$ equal to zero and $K_2$ unequal to zero.

Figure 3:
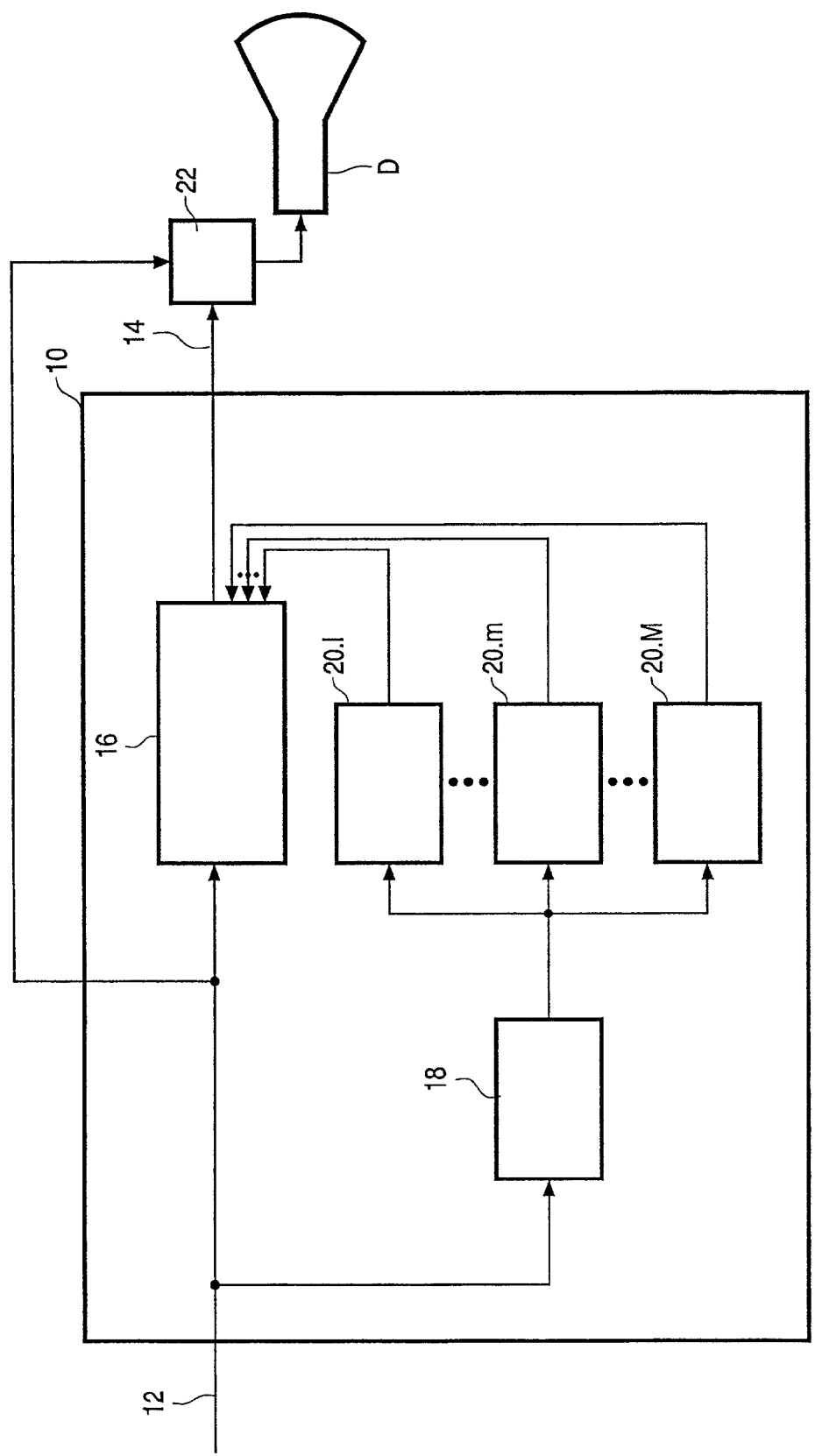
FIG. 3 is a schematic diagram of a display apparatus comprising a device according to the invention for motion-compensated interpolation of the data-signal.

FIG. 3 schematically shows an embodiment of a device 10 for motion-compensated interpolation of a data-signal 2. The input 12 of the device is the data-signal 2 and the output 14 provides interpolated luminous intensities for the image $F^{k+\Delta}$. The input 12 is fed to a block 16 and a block 18. In block 16 the interpolation results according to (VI) and the interpolated luminous intensities according to (VII) are calculated. In block 18 a first motion vector for each group of pixels is calculated. Then, in block 18 a pre-determined number of second motion vectors coming from surrounding groups of pixels are assigned to each group of pixels. This leads a total of M motion vectors per group of pixels. Next, each motion vector $\vec{D}_m^k(\vec{x})$ is fed to its corresponding block 20.m, which block calculates the reliability of the motion vector. Then, by each block 20.m, m=1, ... ,M, the motion vector $\vec{D}_m^k(\vec{x})$ and its estimated reliability are fed to block 16.

Furthermore it is an object of the invention to provide in a picture signal display apparatus that comprises means for receiving a data-signal 2, a device 10 for generating interpolated luminous intensities that includes means (16) for generating an interpolated image, and further means 22 for interleaving said data-signal with the at least one interpolated image and a display device D. Such a picture signal display apparatus for example can be used for generating a 100 Hz television signal out of a 50 Hz input signal.

It will be clear to those skilled in the art that the invention can be practiced otherwise than as specifically illustrated and described without departing from its scope. For example, the described interpolation method can be based on images that are not successive. Furthermore it is possible that more than two images are used in the interpolation method. It is also an option to use the method and/or device of the invention for extrapolating instead of interpolating luminous intensities (in that case the real value $\Delta$ is greater than 1 or less than 0). It should thus be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of motion-compensated interpolation of a data-signal, said data-signal comprising successive images wherein each image comprises groups of pixels, the method comprising the steps of:

generating motion vectors, each motion vector corresponding to a group of pixels of one image, between a group of pixels of said one image and a second group of pixels of another image in the data-signal;

generating interpolated results as a function of these motion vectors;

estimating the reliability of each motion vector corresponding to a particular group of pixels;

calculating weights as a function of the reliability of the motion vectors; and generating an interpolated luminous intensity of a group of pixels for an interpolated image by calculating, on the basis of these weights, a weighted average of the interpolated results.

2. The method as claimed in claim 1, wherein the generation of interpolated luminous intensities is only performed in those parts of the images of the data-signal where edges in the motion vector field of the images are located.

3. A method of motion-compensated interpolation of a data-signal, said data-signal comprising successive images wherein each image comprises groups of pixels, the method comprising the steps of:

generating motion vectors, each motion vector corresponding to a group of pixels of one image, between a group of pixels of said one image and a second group of pixels of another image in the data-signal;

generating interpolated results as a function of these motion vectors;

estimating the reliability of each motion vector corresponding to a particular group of pixels;

calculating weights as a function of the reliability of the motion vectors; and generating an interpolated luminous intensity of a group of pixels for an interpolated image by calculating, on the basis of these weights, a weighted average of the interpolated results, wherein the interpolated luminous intensity of a group of pixels is calculated according to:

$$I^{k+\Delta}(\vec{x}) = \left( \sum_{m=1,\ldots,M} \{w_m^k(\vec{x}) * i_m^{k+\Delta}(\vec{x})\} \right) / \sum_{m=1,\ldots,M} \{w_m^k(\vec{x})\}, \quad (I)$$

wherein $I^{k+\Delta}(\vec{x})$ is the interpolated luminous intensity of the group of pixels of an interpolated image $F^{k+\Delta}$, wherein the location of the group of pixels in the image is defined by the integer two-dimensional vector $\vec{x}$ and where the real value $\Delta$ defines the place of the interpolated image $F^{k+\Delta}$ in the image sequence $F^n$, n=1,2, ... , K,K+1, ... , N, wherein $\Sigma_{m=1}, \ldots , M\{.\}$ is a summation from 1 to M over its argument $\{.\}$ and where $w_m^k(\vec{x})$ is a weight corresponding to the $m^{th}$ interpolation result $i_m^{k+\Delta}(\vec{x})$:

$$i_m^{k+\Delta}(\vec{x}) = \text{median}\{(I^k(\text{round}\{\vec{x} - \Delta * \vec{D}_m^k(\vec{x})\})), (I^k(\vec{x}) + I^{k+1}(\vec{x}))/2), \quad (II)$$
$$(I^{k+1}(\text{round}\{\vec{x} + (1-\Delta) * \vec{D}_m^k(\vec{x})\}))\},$$

wherein median$\{.\}$ is a function which gives the median value of its input arguments and round$\{.\}$ is a function which gives the nearest integer value to each component of its input argument, and wherein $I^k(\vec{x})$ is a luminous intensity of the group of pixels at location $\vec{x}$ of the image $F^k$ and wherein $\vec{D}_m^k(\vec{x})$ is the $m^{th}$ two-dimensional integer motion vector, which is normalized between two successive images, of the M motion vectors which correspond to the group of pixels at location $\vec{x}$ and wherein the weight $w_m^k(\vec{x})$ is a function of the reliability of the motion vector $\vec{D}_m^k(\vec{x})$.

4. The method as claimed in claim 3, wherein the reliability of the motion vector $\vec{D}_m^k(\vec{x})$ is a function of the difference between the luminous intensities $I^k(\vec{x})$ and $I^{k+1}(\vec{x}+\vec{D}_m^k(\vec{x}))$ and wherein the reliability is also a function of the relative frequency of occurrence of $\vec{D}_m^k(\vec{x})$ in the neighborhood of the location $\vec{x}$ in the image $F^k$.

5. A method of motion-compensated interpolation of a data-signal, said data-signal comprising successive images wherein each image comprises groups of pixels, the method comprising the steps of:
generating motion vectors, each motion vector corresponding to a group of pixels of one image, between a group of pixels of said one image and a second group of pixels of another image in the data-signal;
generating interpolated results as a function of these motion vectors;
estimating the reliability of each motion vector corresponding to a particular group of pixels;
calculating weights as a function of the reliability of the motion vectors; and
generating an interpolated luminous intensity of a group of pixels for an interpolated image by calculating, on the basis of these weights, a weighted average of the interpolated results, wherein the generation of interpolated luminous intensities is only performed in those parts of the images of the data-signal where edges in the motion vector field of the images are located, and
wherein the method comprises a step of edge detection, wherein an edge in the motion vector field of image $F^k$ is detected if at least one of the inequalities (C1) and (C2) is satisfied:

$$\left\| \left[ \vec{D}_q^k(\vec{x}-\vec{K}) \right]_1 - \left[ \vec{D}_q^k(\vec{x}+\vec{K}) \right]_1 \right\| > T, \quad \text{(III)}$$

$$\left\| \left[ \vec{D}_q^k(\vec{x}-\vec{K}) \right]_2 - \left[ \vec{D}_q^k(\vec{x}+\vec{K}) \right]_2 \right\| > T, \quad \text{(IV)}$$

where q is a pre-determined integer value and wherein $\|.\|$ is a function which yields the absolute value of its input argument, $[.]_p$ is a function which yields the $p^{th}$ component of its vector input argument, where T is a pre-determined fixed real value threshold and wherein $\vec{K}$ is a vector which is given with:

$$\vec{K}=(K_1;K_2)^T, \quad \text{(D)}$$

where $K_1$ and $K_2$ are integer values.

6. A device for motion-compensated interpolation of a data-signal, said data-signal comprising successive images wherein each image comprises groups of pixels, the device comprising:
means for generating motion vectors, each motion vector corresponding to a group of pixels of one image, between a group of pixels of said one image and a second group of pixels of another image in the data-signal;
means for generating interpolated results as a function of these motion vectors;
means for estimating the reliability of each motion vector corresponding to a particular group of pixels;
means for calculating weights as a function of the reliability of the motion vectors; and
means for generating interpolated luminous intensities of groups of pixels by calculating, on the basis of these weights, weighted averages of the interpolated results.

7. A picture signal display apparatus, comprising:
means for receiving a data-signal, which data-signal comprises successive images wherein each image comprises groups of pixels;
a device for motion-compensated interpolation of said data-signal, as claimed in claim 6;
means for generating at least one interpolated image on the basis of said interpolated luminous intensities; and
means for displaying the at least one interpolated image.

* * * * *